United States Patent [19]

Bracht

[11] 4,291,756

[45] Sep. 29, 1981

[54] HEAT ACCUMULATOR

[76] Inventor: Armand Bracht, 31, rue du Rhin, Kingersheim (Haut-Rhin), France

[21] Appl. No.: 58,199

[22] Filed: Jul. 17, 1979

[30] Foreign Application Priority Data

Jul. 21, 1978 [FR] France .................. 78 22761

[51] Int. Cl.³ .......................................... F28D 21/00
[52] U.S. Cl. ............................ 165/104.17; 62/238.6; 126/436; 126/247; 417/366; 165/104.18
[58] Field of Search .................... 165/104 S, 107; 126/400, 436, 247; 417/366; 62/238.6

[56] References Cited

U.S. PATENT DOCUMENTS 2,575,325  11/1951  Ambrose et al. ............ 62/238 E X
3,968,660   7/1976  Amann et al. ................ 165/64 X
4,067,314   1/1978  Bollefer .
4,109,702   8/1978  Greene ..................... 165/104 S X

FOREIGN PATENT DOCUMENTS 1551994  3/1970  Fed. Rep. of Germany .
2308894  11/1976  France .
2363764  3/1978  France .

Primary Examiner—Albert W. Davis
Attorney, Agent, or Firm—Young & Thompson

[57] ABSTRACT

A heat accumulator comprises a thermally-insulated reservoir full of paraffin wax mixture or other flowable or meltable heat-storage mass, heat-exchangers immersed in the mass, a heat-trap connected to one of the heat-exchangers, and a heat user connected to the other heat-exchanger. Pumps circulate fluids through the heat-trap and the heat-using means and the respective heat-exchangers, and a stirrer agitates and circulates the mass, and the pumps and the stirrer and electric motors driving these devices are all immersed in the mass.

7 Claims, 4 Drawing Figures

HEAT ACCUMULATOR

INTRODUCTION AND BACKGROUND OF THE INVENTION

This invention relates to a heat accumulator.

There have been many proposals for arrangements for recovering or obtaining thermal energy, in particular from sources such as solar radiation or engine exhaust gases or the atmosphere or other fluids. Generally these arrangements comprise means for trapping the energy and transforming it or utilising it.

Nevertheless, the accumulation of such energy is difficult in practice, and there are serious problems in connection with the capacity and bulk and the thermal insulation of heat reservoirs. In practice these reservoirs are generally reservoirs of water heated by the trapped thermal energy and releasing the absorbed energy according to requirements. Also known are so-called "solid accumulators" for example in the form of a stack of refractory stone blocks or the like accumulating the heat and releasing it under the effect of circulating air or other fluid.

Nevertheless, such accumulators must be of large dimensions in order to allow a sufficient storage capacity, because of low amounts of heat in each unit of volume, and therefore not allowing an economical installation in many instances.

Moreover the existing heat accumulators do not usually permit a wide range of easy employment, for example by transport without loss of stored energy from a production point to a utilisation site.

One object of the present invention is to obviate or mitigate the disadvantages indicated above.

BRIEF SUMMARY OF THE INVENTION

According to the invention there is provided a heat accumulator comprising in combination a reservoir, a flowable storage mass within said reservoir, thermal insulation means enclosing said reservoir, heat-transfer means for introducing heat into said mass, heat-recovery means for recovering heat from said mass, a stirrer to stir said mass, and a stirrer motor immersed in said mass for driving said stirrer.

It is advantageous if the said mass is a meltable organic compound, preferably a paraffin or paraffin wax with a melting point in the range 44° C. to 50° C., usually close to 47° C.

One preferred construction is characterized by said heat-transfer means comprising a first pump, said heat-recovery means comprising a second pump, there being a first pump motor for driving said first pump and a second pump motor for driving said second pump, both said first pump motor and said second pump motor being immersed in said mass.

In an advantageous modification the heat accumulator is provided with an autonomous heat trap, for example a solar heat trap or a means for trapping the heat from the exhaust gas of an internal combustion engine, the accumulated heat being recovered either by direct radiation upon uncovering of the reservoir or through the intermediary of a ventilation circuit or the like.

The heat-transfer means and the heat-recovery means may include helical pipe coils of equal diameter and pitch disposed about a common central axis with their windings intertwined but not in contact with each other.

FURTHER DESCRIPTION AND ADVANTAGES OF THE INVENTION

One particularly advantageous form of heat accumulator embodying the invention comprises pipe coils disposed about a common axis and provided with sheet metal baffle plates or casings having external cooling fins, or alternatively there may be only a single pipe coil within the reservoir. In either case the arrangement is such that the accumulator is easily transportable and may be taken and connected to a combustion engine or other source of heat which can be trapped, possibly while the cooling fins are surrounded with a removable insulating jacket, and after the mass has been raised to a suitable temperature the accumulator can be taken indoors or elsewhere for the heat to be delivered by radiation and convection from the fins.

BRIEF DESCRIPTION OF THE VIEWS IN THE DRAWINGS

By way of example the accompanying drawings illustrate four heat accumulators embodying the invention in schematic views, FIG. 1 being a sectional view of a first accumulator, FIG. 2 a sectional view of a second accumulator, FIG. 3 a partial plan view of a third accumulator allied to that of FIG. 2, and FIG. 4 a sectional view of parts of a fourth accumulator.

DETAILED DESCRIPTION OF THE PREFERRED EMBODIMENT

Figure 1:
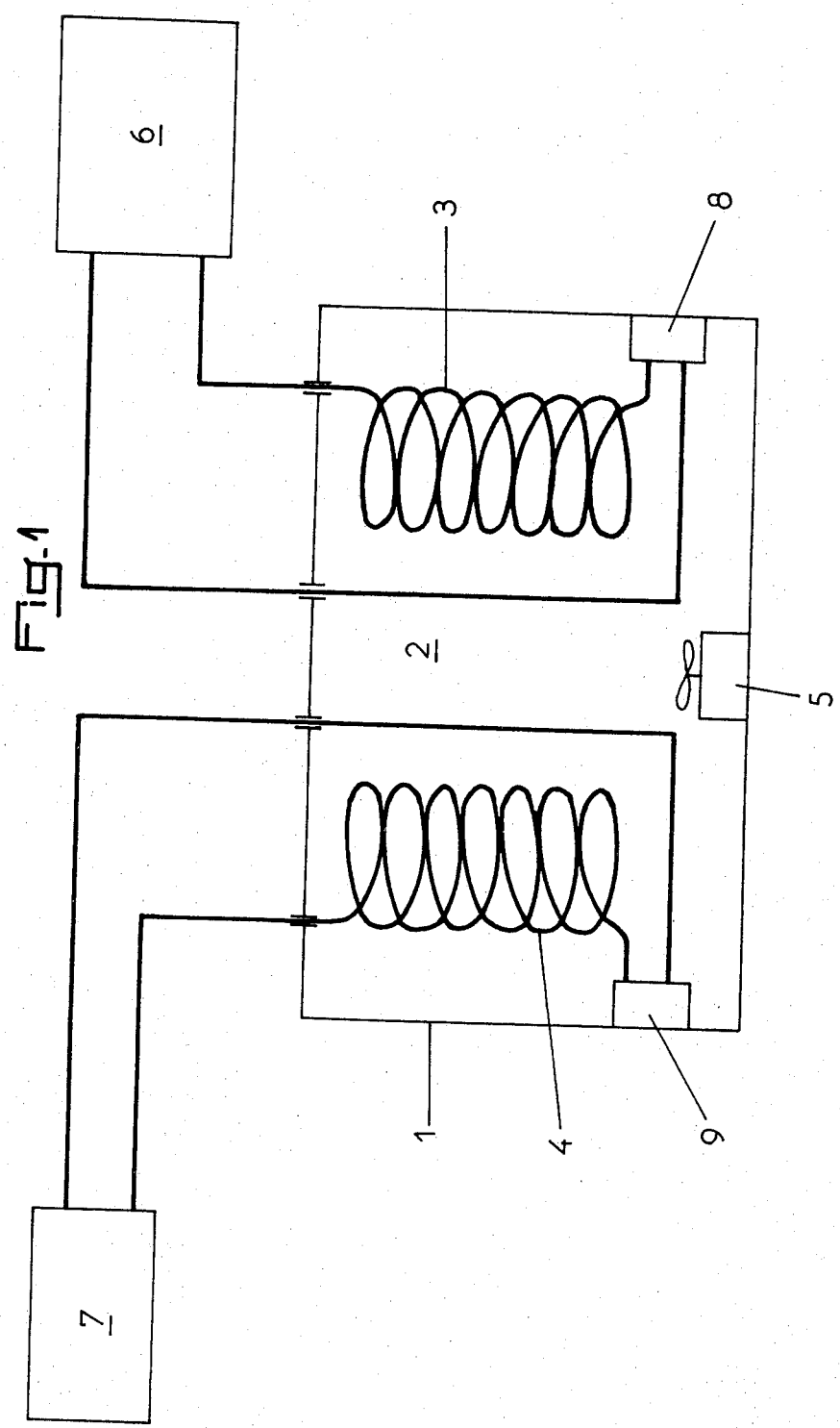

The heat accumulator illustrated in FIG. 1 comprises a reservoir 1 for storing heat, this reservoir 1 containing a flowable or meltable storage mass 2, a heat-transfer means 3 for transferring heat to the mass 2, a heat-recovery means 4 for extracting heat from the mass 2, and a stirrer 5 for circulating the mass 2 within the reservoir 1.

The reservoir 1 is provided with thermally insulating walls or a jacket or the like, and the mass 2 consists of a meltable organic compound, preferably a paraffin wax or mixture which solidifies at normal room temperatures but melts at about 47° C.

Each of the means 3 and 4 comprises a pipe coil immersed in the mass 2. The coil of the means 3 is connected to a pump 8 and a solar heat trap 6. The coil of the means 4 is connected to a heating circuit 7 and a pump 9.

The stirrer 5 and the pumps 8 and 9, together with respective electric motors by which they are driven, are all totally immersed in the mass 2. Thus any heat produced by the stirrer or the pumps or their motors is recovered in the mass 2.

Such immersion is possible because the paraffin wax mixture is electrically insulating, and it also serves for cooling the motors and allows them to be supplied with voltages other than those for which they were designed, without undue risk.

Figure 2:
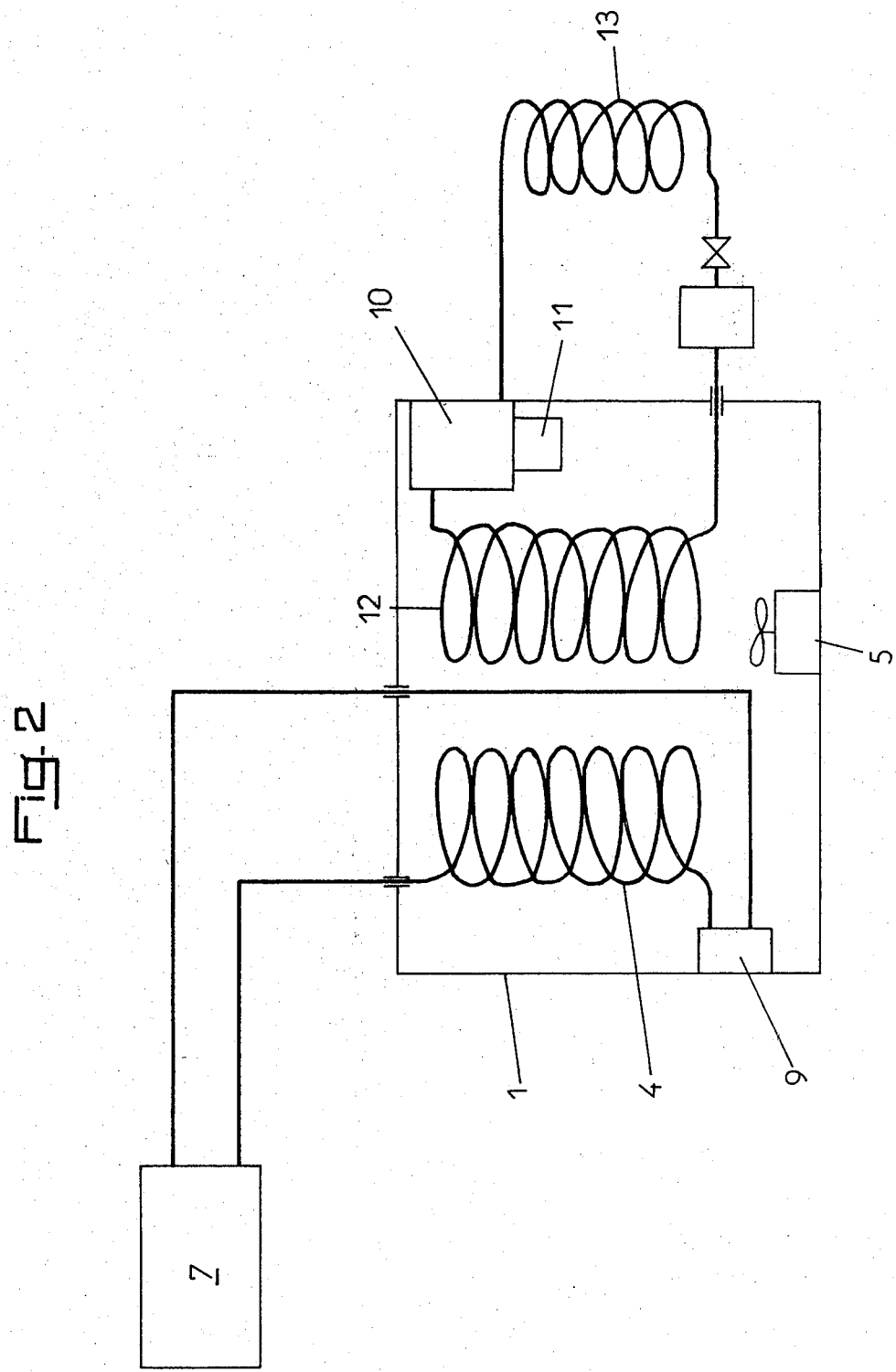

The heat accumulator illustrated in FIG. 2 has various features in common with that of FIG. 1, and like reference numerals indicate like parts, although here the heat-transfer means is different, being in the form of a heat-pump. The heat-pump comprises a compressor 10 driven by a motor 11 and connected to a condenser coil 12 and an evaporater 13. In the circuit for the fluid within the heat-pump there are conventional appropriate valve and control means. It is to be noted that the motor 11 and compressor 10 are totally immersed in the mass within the reservoir 1.

Reverting to FIG. 1, the solar heat trap, which is included in a system for the circulation of water or gas or other fluid, becomes heated by thermal energy due to the absorption of solar radiation. The heated fluid is circulated, by means of the pump 8, through the pipe coil of the means 3. This pipe coil thus heats the mass 2 surrounding it and initiates its melting at approximately 47° C. In order to induce a more effective cooling of the pipe coil of the means 3, and thus a more effective transfer of the heat to the melted mass 2, the stirrer 5 is put into action to stir the mass 2. The action of the stirrer 5 agitates the mass 2 to effect rapid melting of any portions of the mass which initially remain solid or semi-solid, particularly where adherent to the walls of the reservoir 1. The stirring also ensures more uniform distribution of the heat throughout the mass 2. In practice the stirring of the mass 2 is continuous in order to improve the cooling of the pipe coil of the means 3 and the transfer of the heat to the liquified mass 2. Moreover, by the stirring of the mass 2, the heating of the coil of the means 4 is likewise improved. The paraffin wax mixture electrically insulates and cools and lubricates the three immersed motors, and the cost of supplying power to these motors is offset owing to the recovery of the heat which they produce.

The functioning of the heat accumulator illustrated in FIG. 2 is generally similar to that of the accumulator of FIG. 1, allowing for the differences in the heat-transfer means.

Figure 3:
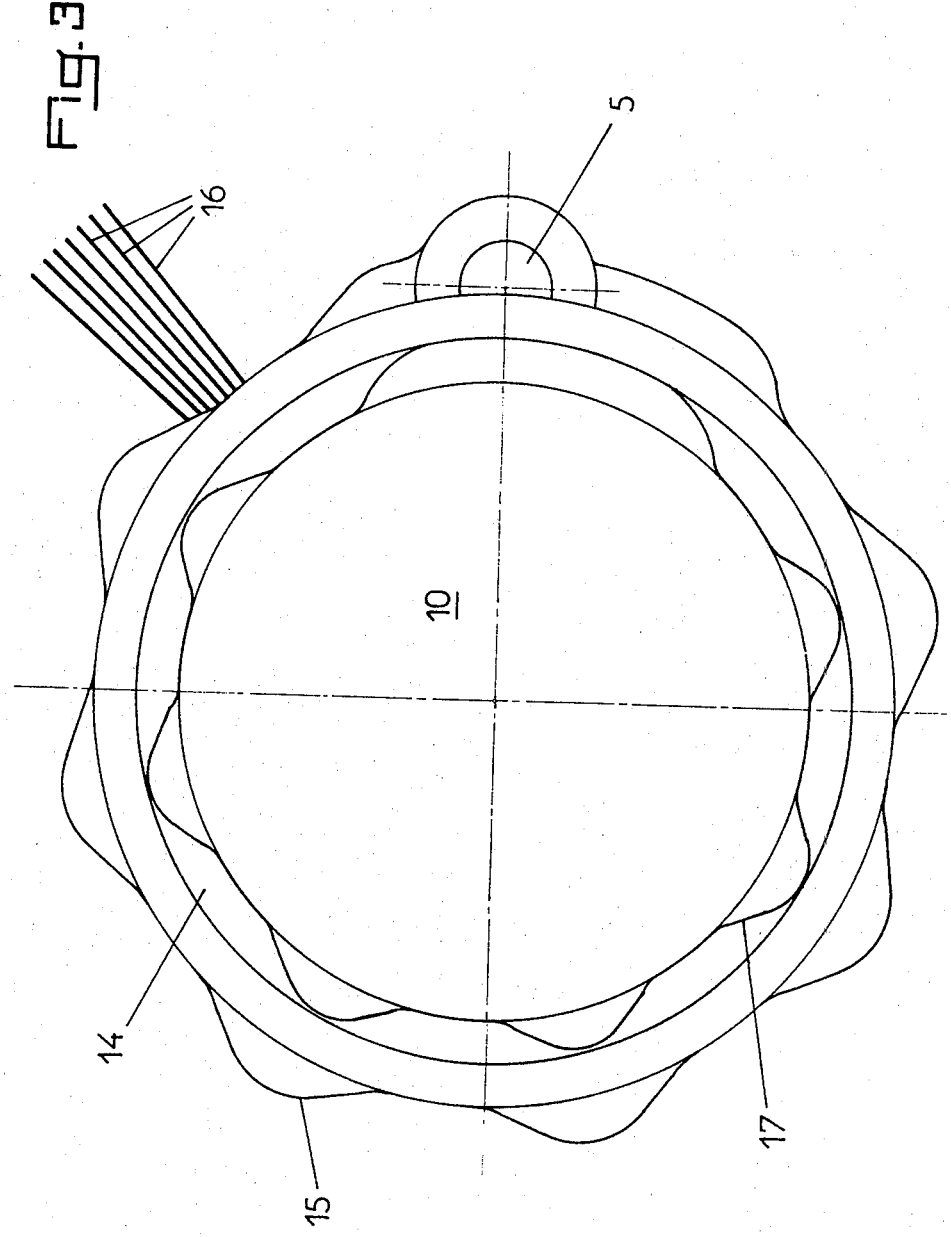

FIG. 3 illustrates a modification in which the two pipe coils of the heat-transfer means and heat-recovery means are in the form of helices of equal pitch and diameter disposed about a common central axis and intertwined so that their windings are between one another without touching one another, that is to say the two pipe coils are "screwed" one into the other. In this embodiment the two pipe coils surround the compressor 10 of a heat-pump with the formation of a space 14, and are themselves surrounded by a casing or sheet metal baffle plate 15 provided with cooling fins 16. The stirrer 5 is advantageously disposed at the lower zone of the pipe coils between the compressor 10 and the baffle plate 15 in such a manner as to propel a proportion of the heat storage mass through the space comprised between the baffle plate 15 and the compressor 10, the latter being provided with a baffle plate 17 generally similar to the baffle plate 15.

With this construction there is obtained efficient transmission of the heat both from the heat-transfer means and to the heat-recovery means, continuous stirring being effected with good recovery of the heat produced by the various motors. Obviously this construction may be used with a solar heat trap or any other convenient source of cheap heat.

Figure 4:
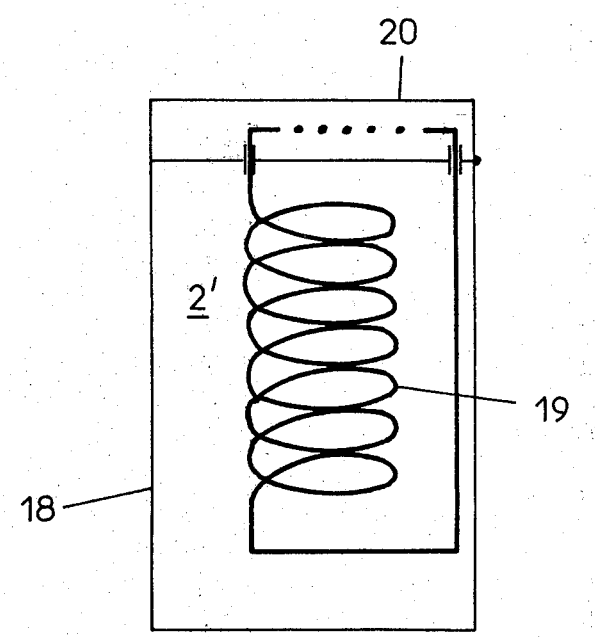

FIG. 4 illustrates parts of a modified heat accumulator comprising a transportable reservoir 18 accommodating a pipe coil 19 connected to a solar heat trap 20 embodied in the cover of the reservoir 18. A fluid circulates within the pipe coil 19 and the heat trap 20 by a thermosyphon effect in order to heat the mass 2' in the reservoir 18. After a period of heating the accumulator can be transported to a site where heat is required, in order to release the heat by direct radiation after uncovering the top of the reservoir 18, that is to say after lifting of the heat trap 20. It is, of course, possible to provide the heat accumulator with a heat-recovery means (not shown) comprising a pipe coil or the like which can be connected into a heating circuit or other heat-using apparatus. Alternatively the accumulator of FIG. 4 could be provided with means for circulating warm air, for example through a ventilation circuit after opening inlet and outlet apertures, and a battery-powered stirrer could be provided.

Such a transportable heat accumulator can be well adapted to be heated by exhaust gas from an internal combustion engine.

Furthermore it is possible, in a further modified embodiment of the invention which is not illustrated, to employ an internal combustion engine in order to drive the pump or compressor of a heat-pump, the storage mass being employed for cooling the compressor and/or for cooling the engine. With this manner of construction the cost of supplying the engine with fuel can be substantially ameliorated since much of the heat escaping from the engine can be trapped and utilised.

From the above description it will be appreciated that the invention facilitates the construction of compact and efficient heat accumulators whereby stray heat can be trapped and stored economically for subsequent use.

What is claimed is:

1. A heat accumulator comprising in combination a reservoir, a flowable storage mass within said reservoir, thermal insulation means enclosing said reservoir, heat-transfer means for introducing heat into said mass, heat recovery means for recovering heat from said mass, a stirrer to stir said mass, and an electrical stirrer motor immersed in said mass for drawing said stirrer, said mass being a meltable organic compound which is solid at room temperature and being electrically insulative and lubricative.

2. An accumulator as claimed in claim 1, said mass being a paraffin with a melting point in the range of 44° C. to 50° C.

3. An accumulator as claimed in claim 1, said heat-transfer means comprising a first pump, said heat-recovery means comprising a second pump, there being a first pump motor for driving said first pump and a second pump motor for driving said second pump, both said first pump motor and said second pump motor being immersed in said mass.

4. An accumulator as claimed in claim 2, further comprising a pump circulating fluid through said heat-transfer means, and a motor driving said pump, both said motor and said pump being immersed in said flowable mass.

5. An accumulator as claimed in claim 1, said heat-transfer means comprising a first pipe coil, said heat-recovery means comprising a second pipe coil, both first pipe coil and second pipe coil being immersed in said mass.

6. An accumulator as claimed in claim 1, said heat transfer means being in the form of a heat-pump including an evaporator and valve means outside said reservoir, and all immersed in said mass a compressor and a compressor motor driving said compressor and a condenser.

7. An accumulator as claimed in claim 1, comprising two heat-exchangers immersed in said mass, one of said heat-exchangers being included in said heat-transfer means, the other of said heat-exchangers being included in said heat-recovery means.

* * * * *